April 7, 1936.     L. D. JONES     2,036,966

DEWAXING OIL

Filed Dec. 20, 1930

INVENTOR
Leo D. Jones
BY his ATTORNEYS
Kenyon & Kenyon

Patented Apr. 7, 1936

2,036,966

UNITED STATES PATENT OFFICE 2,036,966

DEWAXING OIL

Leo D. Jones, Philadelphia, Pa., assignor to The Sharples Specialty Company, Philadelphia, Pa., a corporation of Delaware Application December 20, 1930, Serial No. 503,845

31 Claims. (Cl. 196—19)

This invention relates to a process for the removal of wax from oil of various kinds and from fractions or other bodies of oil obtained from larger bodies of oil by various operations.

In the removal of wax from oil, a body of the oil that is in a diluted condition, either by reason of the addition of a solvent or as a result of the operations by which the body of oil is obtained, is chilled to precipitate wax therein and precipitated wax is then removed by the best adapted known method provided some one of the known methods is capable of removing the wax that is so precipitated.

The characteristics of wax that occurs naturally in oil or is dissolved therein vary greatly. Wax precipitated by chilling a diluted body of oil may be distinctly amorphous or distinctly crystalline or it may be in an intermediate state in which it is neither definitely and wholly crystalline nor definitely and wholly amorphous.

The characteristics of wax that will be precipitated in a solution of the oil by chilling are somewhat forseeable when the source or kind of oil is known and when the treatment applied to the oil is known; but the characteristics of the wax are best determined by a consideration of the wax after it is precipitated. Herein reference will be made to wax of various characteristics and while the kinds of oil to which this invention applies may be determined by the source and mode of production and possibly by other data or history relating to the oil, it is important in determining the oils to which this invention applies that consideration be given to the actual characteristics of the wax precipitated by chilling. The invention is not limited to the dewaxing of any particular kind of oil or oil prepared in any particular manner but applies to oil of any kind or from any source that contains wax of the characteristics specified.

It will be assumed herein that the oil to be dewaxed is in dilute condition before the wax therein is precipitated by chilling. The dilution of the oil, resulting either from the addition of a solvent or from previous treatment of the oil, should be sufficiently great to insure that the wax will precipitate in separate particles or crystals that are not so crowded in the residual liquid that they are caused to coalesce or to be broken down into a homogeneous mass. Also, having due regard to the relative specific gravities of the oil and the wax, the oil should contain a sufficient quantity of solvent as a result of the preliminary treatment of the oil or as a result of the addition of a suitable solvent, to insure the existence of a proper specific gravity differential between the precipitated wax and the residual oil or oil-solution. When some fractions of petroleum are prepared by cracking distillation, the distillate contains so much gas oil that wax may satisfactorily be precipitated by chilling and removed from the oil without the addition of other solvent prior to chilling.

If the wax precipitated by chilling is distinctly amorphous, as in the case of the wax so precipitated in steam refined cylinder stock produced by careful steam distillation of a wax-bearing crude petroleum, such wax may be separated from the oil to some extent by the well known cold settling process and may be more completely removed from the oil by centrifugal processes such as described in Sharples Patent No. 1,351,265.

If the wax precipitated in the oil by chilling is distinctly crystalline, as in the case of wax precipitated by chilling from a distillate produced by cracking distillation of petroleum after gas, naphtha, burning oils and gas oil have been removed therefrom, the precipitated wax may be removed from the oil by the well known filter-pressing operation.

In the usual operations performed in the refining of oils, and particularly petroleum oils, bodies of oil occur that contain wax of such nature that when the wax is precipitated by chilling of a dilute body of the oil, even when proper procedure is followed in the chilling operation it is either too amorphous to be removed from the oil by filter-pressing or too crystalline, in whole or in part, to be separated from the oil solution by cold settling. Examples of oils containing such wax are fractions of petroleum of intermediate viscosity and boiling point, in which the wax may be said to be in an intermediate state. Other examples of such oils are mixtures of oil that contain wax that tend to be crystalline when precipitated by chilling, with oil that contains wax that is amorphous when precipitated by proper chilling.

If some of the wax in such oils is crystalline when precipitated, it tends to impair the continuous discharge of wax from a centrifugal bowl by which it is sought to remove the wax from the oil centrifugally.

Formerly oil that contains wax of such a nature that it cannot be removed from the oil, even when proper procedure is followed in the diluting and in the manner of chilling in precipitating the wax, either by filter-pressing through the duct employed in such operations or by cold-settling, was subjected to cracking distillation before dewaxing. The wax in the oil was thereby converted into wax that would precipitate in a wholly crystalline form at temperatures heretofore employed in filter pressing, and it existed in that state in the distillate; but while cracking distillation brought the wax to a form in which it can be removed conveniently and economically, there was considerable loss due to incidental conversion of lubricating oil into non-lubricating oil such as gas oil. In some cases oil containing wax which cannot be removed by filter-pressing or cold-settling even when properly precipitated, was de-waxed by diluting the oil and then adding paper pulp thereto and then chilling and filter-pressing through cloth. It has also been suggested that keiselguhr or fuller's earth be used for the purpose of similarly gaining the same result that follows from adding paper pulp prior to dewaxing. However, the addition of such a foreign substance, commonly called a "filter-aid", is objectionable because it increases the amount of refrigeration necessary and the foreign substance must be removed from the wax separated from the oil, such removal often requiring troublesome and expensive operations such as extracting wax with naphtha from filter-aid.

Oil containing wax which cannot be removed by filter-pressing or by cold-settling, even when properly diluted and precipitated, may be dewaxed by special centrifugal processes, but the practice of those processes, while very successful in their application, requires special care. Thus, in my copending Patent No. 1,784,525 of December 9, 1930, I have described a process whereby such oil may be dewaxed when it contains at the beginning of the dewaxing operation impurities other than hard asphalt that naturally occur in the oil, such impurities apparently acting upon the wax to increase its specific gravity and increase its fluidity and thereby facilitate separation of the wax by centrifugal subsidence. Again, in my application Serial No. 147,383, filed November 9, 1926, upon which issued Patent No. 1,881,643 on October 11, 1932, I have described a method whereby the fluidity of the precipitated wax is increased, as by the addition of amorphous wax obtained from an external source or brought into the mixture by blending, to a point at which the wax may be separated by centrifugal subsidence. The principles of the two applications last mentioned are capable of conjoint use. Also, in my application Serial No. 242,028, filed December 23, 1927, I have described a method wherein a solvent is employed that imparts to the resulting oil-solvent solution a greater specific gravity than any of the wax precipitated therein, the principles of that invention being applicable in the practice of this invention, including the fact that with some heavy solvents final temperatures of chilling need not be so low as when petroleum products are used as solvents.

In the cold-settling process employed for the removal of amorphous wax from steam refined cylinder stock the chilling was seldom, if ever, carried substantially below 10° F., producing oil of 50° F. cold test. In the centrifugal dewaxing of oil, regardless of whether amorphous wax was removed by simple centrifugal processes or wax of a more or less intermediate nature was removed by special centrifugal processes, the chilling of the oil for the precipitation of the wax has not been carried substantially below —15° F. and usually the oil is chilled to about —10° F., such practice producing oil of 20° F. cold test. In the removal of crystalline wax from oil by filter-pressing the chilling is not carried substantially below 15° F., producing oils of 30° F. cold test. Even before the production of lubricating oil in large quantities from waxless crude petroleum the chilling was not carried substantially below —5° F. in the removal of crystalline wax by filter-pressing; and, furthermore, temperatures below 15° F. were employed in removal of wax by filter-pressing only in connection with special low-viscosity distillates, producing oils of 10° F. cold test if temperatures as low as —5° F. were employed, temperatures below —5° F. never having been used.

I have found that when oil contains wax that is too crystalline to be removed by cold-settling or by simple centrifugal processes when chilled to the temperatures employed in common practice and that is too amorphous to be removed by filter-pressing when the oil is chilled to the temperatures employed in common practice, such oil may nevertheless be dewaxed by subsidence, particularly by centrifugal separation, if the oil containing such wax is chilled to a very much lower temperature such as a temperature between —20° F. and —40° F., chilling to a temperature of —30° F. giving excellent results in most cases. If such oils are chilled to the temperatures formerly employed and dewaxed by one or other of my special centrifugal processes above referred to, the dewaxed oil may have a cold test of about 25° F., but if such oil is chilled to —30° F. and dewaxed by a simple centrifugal dewaxing operation the resulting oil will have a cold test between 10° F. and 0° F. The use of such extensive chilling, in accordance with my invention, in connection with oils containing wax that is sufficiently amorphous, when precipitated by the use of temperatures formerly employed, to be removed by cold-settling or by more simple centrifugal dewaxing operations, gives oil having a lower cold test than the oil produced by the use of chilling temperatures heretofore employed; but oil containing intermediate wax cannot be dewaxed by simple centrifugal processes unless the chilling is carried, in accordance with my invention, to temperatures much lower than temperatures formerly employed in dewaxing operations generally.

A further development of my invention resides in the fact that some oils which may be dewaxed by ordinary filter-pressing to produce oil having a cold test of 30° F., may in the practice of this invention be dewaxed by centrifugal subsidence to produce oil of much lower cold test.

In the practice of this invention the wax precipitated by reducing the temperature of the oil to such low temperatures as —30° F. is sufficiently fluid that it may be continuously discharged from a centrifugal bowl employed in the centrifugal dewaxing of the oil even though the wax precipitated by reducing the temperature of the oil to —10° F. would be so firm or crystalline as to interfere with the continuous discharge of the wax from a centrifugal bowl.

If naphtha is employed as a solvent in preparation for the precipitation of wax by chilling, a mixture may be made of which 30% to 35% consists of oil to be dewaxed and 70% to 65% consists of naphtha having a specific gravity in the neighborhood of 65° Bè.

For the purpose of assisting in the identification of oils which may be dewaxed in accordance with this invention it is pointed out that examples of oil containing wax that, when precipitated in a dilute solution, is too amorphous to be removed by filter pressing and too crystalline to be removed by cold-settling or by a simple centrifugal dewaxing process even at —10° F., are as follows:

A. That fraction obtained from a typical Pennsylvania crude petroleum by steam distillation which begins at 80 seconds universal Saybolt viscosity at 100° F. and ends when the residue has a gravity of 27° Bè. or has a fire test of 600° F.

B. That fraction obtained from a typical mid-continent crude petroleum by steam distillation which begins when the oil in the stream has a viscosity of 80 seconds universal Saybolt viscosity at 100° F. and extends to a point at which the residue is a 600° F. fire test cylinder stock.

Also there are the heterogeneous mixtures of oil, made accidentally or intentionally, in which the wax precipitated by chilling the oil after dilution cannot be removed by filter-pressing or cold-settling or simple centrifugal methods.

In the practice of this invention a solvent may be employed, such as dichlor ethane, gas oil, carbon tetrachloride, dichlor propane, carbon disulphide, chlor benzene, etc., that will insure that the resulting oil solvent solution will be heavier than any wax precipitated therein. For example, in preparation for the precipitation of wax by chilling a mixture may be made of which 30% to 35%, by volume, consists of oil to be dewaxed and 70% to 65% consists of dichlor ethane.

I do not intend to be bound by any theory concerning the reason why intermediate wax that is too amorphous to be removed by filter-pressing and too crystalline to be removed by cold-settling or by simple centrifugal dewaxing processes, is brought to a state in which it may be removed by subsidence, and particularly by centrifugal separation, by chilling the oil to temperatures substantially below the temperatures formerly employed in the removal of amorphous wax by cold-settling and by centrifugal processes and in the removal of crystalline wax by filter-pressing.

However, it is my present belief that by carrying the chilling to a temperature substantially below temperatures heretofore employed and below temperatures that will produce from oils capable of being dewaxed by former processes an oil having a satisfactory cold test, the chilling that occurs between temperatures formerly employed and the temperatures employed in the practice of this invention effects the precipitation of wax that is markedly amorphous in character and imparts amorphous characteristics to whatever wax would be precipitated by the employment of temperatures formerly used.

In the practice of my invention the diluted oil is preferably chilled in accordance with the principles described in my Patent No. 1,558,619 of October 27, 1925, in such a manner that the chilling is effected without shock, by employing a cooling medium of such temperature that the temperature differential between the oil and the cooling medium is substantially uniform during the cooling of the oil and equal to only a small fraction of the total range of temperature through which the oil is cooled to effect precipitation of the wax. Prior to chilling, and particularly when a solvent is added to the oil, the oil is heated to about 100° F. to ensure that all of the wax will be in solution when the chilling begins.

To assist in an understanding of my invention I have shown diagrammatically in the single sheet of drawings apparatus whereby my invention may be practised.

Figure 1:
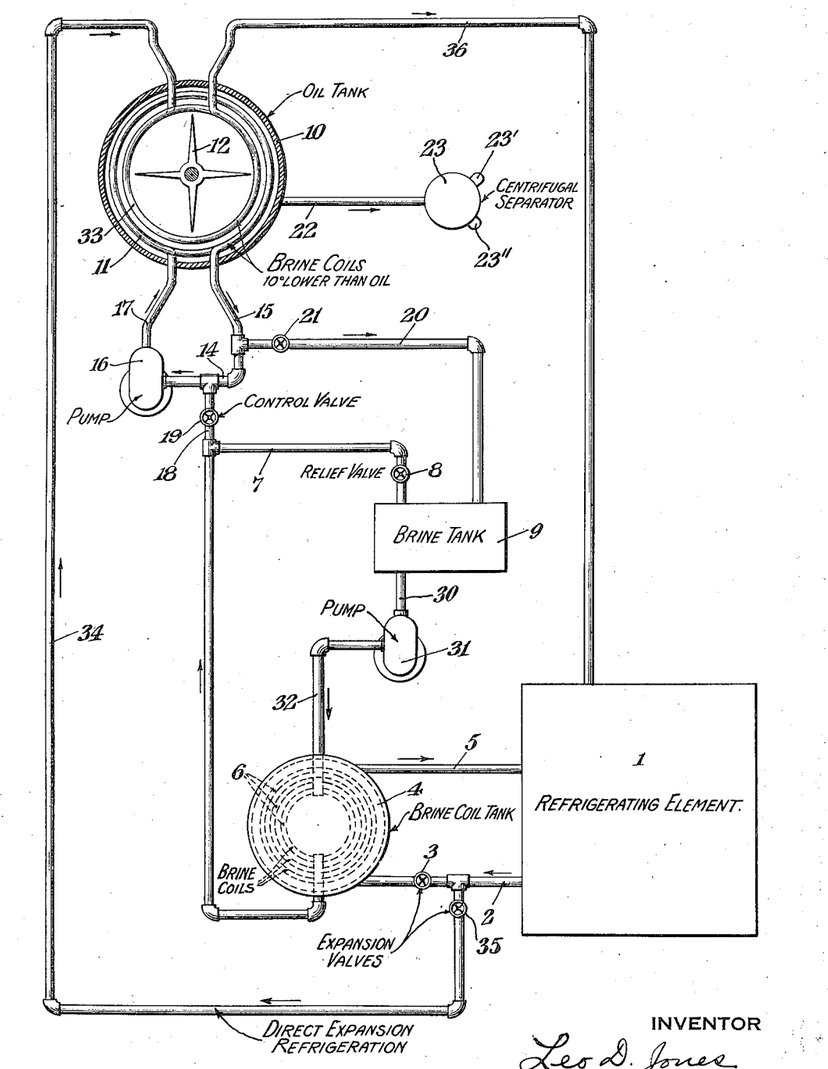

Oil that is to be dewaxed and which is in a diluted condition, as a result of the operations by which it was prepared or as the result of the addition of a solvent, is heated up until all of the wax is dissolved and then introduced into a tank 10 which contains brine coils 11 and in which is mounted an agitator such as the rotatable wheel 12.

From the refrigerating element 1 anhydrous liquid ammonia flows through pipe 2 and expansion valve 3 to the brine cooling tank 4 which is connected by the return pipe 5 with its refrigerating element 1.

Brine coil 6 in tank 4 forms a part of a circulating conduit comprising pipe 7, containing relief valve 8, tank 9, pipe 30, pump 31, and pipe 32, the pump circulating through the conduit so formed, the body of brine contained in tank 9.

The coils 11 are so arranged as to produce convection currents in the oil in tank 10 that will prevent subsidence of precipitated wax and assist the agitation effected by agitator 12, and these coils are supplied with brine from the circulating conduit above described. The coils 11 form a part of a second circulating conduit comprising pipes 14 and 15, pump 16, and pipe 17. Pipe 18 contains a vave 19 and connects pipe 7 with pipe 14 and from pipe 15, pipe 20 containing a valve 21 leads back to brine tank 9.

Also within tank 10 is a second coil 33 having one of its ends connected by pipe 34, which contains valve 35, with the anhydrous-ammonia-supply pipe 2, pipe 36 leading from the other end of coil 33 back to refrigerating element 1.

Pump 16 circulates brine through the second mentioned circulating system comprising pipe 17, coil 11 and pipes 14 and 15, and in order to chill the oil in tank 10 a small quantity of cold brine from coil 6 is admitted to this circulating system through valve 19. This small quantity of cold brine mixes with the warmer brine flowing from coil 11 and results in a reduction of the temperature of the brine entering coil 11 through pipe 17, and a quantity of brine passes out through valve 21 that is equal to quantity of brine entering through the valve 19. By regulation of valve 19 it is possible to control the temperature of the brine circulating through coil 11 in order to maintain a desired temperature differential between the oil in tank 10 and the brine in coil 11, regardless of the actual temperature of the brine entering through valve 19. For example, it is possible that the oil in tank 10 may be 70° F. and the brine in coil 11 may be 60° F. whereas the brine entering through vave 19 may be —20° F. Satisfactory results are obtainable by maintaining the temperature differential between the oil and the brine in coils 11 at about 10° F. Proper proportioning of the surface of coil 11 and the capacity of pump 16 make it possible to maintain that temperature differential at substantially the same value with respect to both the brine entering coil 11 and the brine leaving that coil.

After the oil in tank 10 has been cooled to about —10° F., valve 35 may be opened in order to evaporate ammonia through coil 33 for the purpose of still further reducing the temperature of the oil to a temperature between —30° F. and —40° F., e. g., —30° F., brine circulation being stopped when ammonia is admitted to coil 33.

By cooling the oil to —10° F. by means of brine having a proper temperature differential with respect to the oil, the temperature differential at the time the use of ammonia in coil 33 is begun is not great enough to effect undesirable shock chilling and chilling to low temperatures is effected without the lack of economy that would occur if it were sought to cool the oil to −30° F. by means of cold brine alone.

When the oil has been chilled to such an extent in accordance with my invention that the wax therein has been precipitated to a desirably complete degree and the precipitated wax is of such character that it may be removed by subsidence, and particularly by centrifugal separation the oil is conducted by pipe 22 to a centrifugal separator 23 from which dewaxed oil is discharged through spout 24 and wax is discharged through spout 25. The centrifugal separator employed may be similar in character to that shown in the patent to P. T. Sharples No. 1,232,104 and it may be operated in accordance with the principles described in that patent, the centrifugal dewaxing being accomplished substantially in accordance with the principles described in Patent No. 1,351,265 to P. T. Sharples. It is to be observed that in such centrifugal separation an imperforate rotor is employed and the heavier constituent passes radially outward under the action of centrifugal force through the lighter constituent and the lighter constituent moves toward the axis of rotation. This phenomenon is termed "centrifugal subsidence" in the centrifugal art in order to distinguish this type of centrifugal separation from centrifugal separation in a perforate rotor, which separation is a mere straining or draining action.

In the practice of this invention wax that is contained in oil and is of such nature that if it is precipitated in accordance with prior practice, it cannot be removed from the oil by filter-pressing or by cold-settling or by more simple centrifugal processes, is precipitated in the oil in such a state that it may be removed from the oil by subsidence and particularly by centrifugal separation. Thus, in the practice of this invention the precipitated wax is sufficiently fluid that it may be continuously discharged from a centrifugal bowl during centrifugal dewaxing of the oil. In order that it may be sufficiently fluid for this purpose, the wax need not be as free flowing as the oil but its fluidity may be comparable to the fluidity of petroleum jelly. The wax need only be sufficiently fluid to flow, under the action of centrifugal force, through the passages and out of the discharge openings of a centrifugal bowl.

When it was sought to dewax by the methods of prior practice some bodies of oil such as fractions obtained from petroleum and having a universal Saybolt viscosity from 300 seconds to 800 seconds at 100° F., the crystallinity of the wax or of some part thereof frequently caused the formation of bodies of wax that were so firm or hard that they would not flow within the centrifugal bowl or the discharge passages thereof, but in accordance with this invention the wax in such bodies of oil may be brought to a sufficiently fluid condition to permit removal thereof by centrifugal methods.

Heretofore it has been a practical impossibility to dewax fractions obtained from wax-bearing petroleum and having an intermediate viscosity, to such an extent that lubricating oils having a cold test of 0° F. could be obtained. Lubricating oils of such viscosity and having a low cold test have been obtained heretofore from naphthene-base oil containing no wax, but such oils are inferior to paraffin-base oils in lubricating qualities. Thus, in accordance with this invention, low cold test oils are readily obtained that have both the advantages possessed by lubricating oils obtained from naphthene-base crude oils and the advantages possessed by such oils obtained from paraffin-base crude oils. For example, straight run paraffin distillates may be so completely dewaxed in accordance with this invention that the final product is a lubricating oil having a cold test as low as or below 5° F. and derived from paraffin-base oil. A very important feature of this invention is that such low cold test oils are obtained through the practice thereof from fractions that are of intermediate viscosity and are taken from paraffin-base oils. Heretofore it has been necessary to subject fractions of intermediate viscosity to cracking distillation, with consequent losses in order to bring the wax to a crystalline state in which it may be removed by filter-pressing.

A possible explanation of the causes whereby it is possible by the practice of this invention to dewax by simple centrifugal processes continuously operating, and without special preparatory treatment, oils that cannot be dewaxed by the methods of prior practice, may reside in a change wrought in the oil by the severe chilling as contrasted with the change, whereby precipitation of the wax is brought about, wrought in the wax by chilling practised in prior processes. Thus, it may be that as the temperature is lowered the solubility of the oil in the naphtha decreases while the solubility of the oil in the precipitated wax increases with the result that there is a transfer of oil from the liquid to the precipitate increasing the fluidity of the precipitate. This may be the explanation of the reasons why wax may be centrifugally removed from oil if the oil is chilled to −30° F. although it cannot be so separated from the same oil if the oil is chilled to only −10° F. or 15° F.

In the practice of this invention ordinary refinery practice will be followed in the preparing of oils for dewaxing, such as distillation, separation from water, removal of hard asphalts, and removal of color-forming impurities wherever desirable. Subsequent to the dewaxing operation the dewaxed products will be reduced to commercial stocks, commonly prepared in refinery practice, as by distillation to desired viscosity and fire test, and further purification to final color requirements, if this be necessary. However, the principles of my applications above mentioned may be practised conjointly with the principles of this invention and preparation for the dewaxing step may include regulation of the impurities in the oil and other steps described in said applications.

From the foregoing it will be apparent that I have described a method, and products produced thereby, whereby wax may be removed from wax-containing petroleum oils to produce therefrom oils having a lower cold test than the cold test of oils of similar characteristics heretofore produced from such sources; and it will also be apparent that in the practice of my invention it is possible to employ continuous centrifugal separation of wax precipitated by chilling, to effect the removal of wax for the production of such lower cold test oils, not only in connection with oils containing wax that is so amorphous in character that when precipitated by chilling it can be so separated even when the chilling is carried only to —15° F., but also, as a separate and special feature of this invention, in connection with oils containing wax that is of such nature that it is not well suited to such separation when precipitated by chilling to —15° F. Accordingly, my method, regardless of whether it is practised in conjunction with the principles of my applications and patent above mentioned, but particularly when it is so practised, provides for the production of such lower cold test oils from petroleum oils containing wax that varies extensively in content of crystalline wax, from wax that contains so much crystalline wax that it is not well suited to removal by continuous centrifugal separation when precipitated by chilling to —15° F. to wax that is substantially free of crystalline wax. Such lower cold test oils, being obtained from oils which contain wax varying so extensively in character, will yield by common steps of refinery practice such as distillation and purification, oils having such lower cold test and corresponding in viscosities, fire tests and color characteristics to substantially all commercial grades or types of oils produced heretofore from wax-containing petroleums.

The general characteristics of wax in wax-containing petroleums and the general characteristics of oil obtained from such petroleums and containing such wax are now known at least to a sufficient extent to facilitate the identification of oils identified herein by reference to the character of wax contained in them but the known characteristics of such oils are discussed hereinafter as a convenience in identifying such oils.

Proceeding with such discussion, if a body of oil containing all or substantially all of the lubricating constituents of a wax-containing petroleum is separated therefrom, either by forming a residue free of naphtha, burning oil and gas oil or by forming a distillate free of those constituents but containing the remainder of the petroleum except perhaps the asphalt, such segregated body of oil will contain substantially all of the wax that existed in the original crude oil, both crystalline wax and amorphous wax; and the wax precipitated from the body of oil by chilling to —15° F. is likely to be so much affected by the crystalline wax present that continuous centrifugal removal will be impaired or prevented in spite of the fact that the amorphous wax is also present. If some of the highest boiling constituents of the crude petroleum are left out of such a segregated body of oil the proportion that is crystalline of the wax remaining therein will be greater and the influence of the crystalline wax on continuous centrifugal removal of wax will be greater. If more of the lighter constituents of the crude petroleum next higher boiling than the gas oil, are omitted from the body of oil so segregated the proportion that is crystalline of the wax remaining in that body will be smaller and the crystalline wax will impose less difficulty upon continuous centrifugal removal of precipitated wax. As still more of the lighter constituents are distilled off more and more of the crystalline wax will be removed from the segregated body of oil and eventually it will contain only wax that precipitates in distinctly amorphous form and the difficulties imposed by crystalline wax upon continuous centrifugal dewaxing will no longer exist. Thus, in the dewaxing of oils the difficulties encountered in effecting continuous centrifugal separation of precipitated wax increase as the form in which the wax precipitates is less and less amphorous and more and more influenced by the presence of crystalline wax, and those difficulties decrease as the form in which the wax precipitates is more and more completely amorphous and less and less influenced by the presence of crystalline wax. It is only when crystalline wax affects the character of the precipitated wax that difficulties arise in the continuous centrifugal removal of the precipitated wax; and if a method suitable to the removal of amorphous wax, such as continuous centrifugal separation, can be carried out, as by the incorporation therein of special modifying features such as those described in my Patents Nos. 1,784,525 and 1,881,643 above mentioned, in such a way as to remove precipitated wax effectively in spite of the presence of crystalline wax, the removal of wax that precipitates in distinctly amorphous form, by that modified process, is naturally to be expected and presents no problem since the Sharples Patents No. 1,351,265, No. 1,416,890 and No. 1,416,891 disclosed processes which are entirely successful in the removal of wax that precipitates in distinctly amorphous form, as well as in the removal of waxes that contain some crystalline wax. Accordingly, the use of continuous centrifugal separation in the practice of this invention constitutes a distinct advance in the art in that it provides another method, which may be used with or separately from the methods described in my patents and applications above mentioned, whereby continuous centrifugal separation may be employed in the dewaxing of oils, mentioned in that patent and those applications and herein, which contain enough crystalline wax to impair or prevent simple centrifugal dewaxing. And, inasmuch as centrifugal dewaxing is successful in the practice of this invention in the dewaxing of such oils it is naturally successful in the dewaxing of oils from which more of the crystalline wax has been dropped out and the remaining wax is substantially all amorphous. The feature of this invention which has just been mentioned whereby crystalline wax containing oils may be successfully dewaxed by continuous centrifugal separation is additional to the features whereby oils of lower cold test are produced.

Continuing the general discussion of oil, it is desirable to purify the oil to desired color before dewaxing it if the oil does not contain crystalline wax in sufficient proportion to impair wax removal by processes suitable to the removal of amorphous wax; and if the oil contains such proportion of crystalline wax it is desirable, as set out in my Patent No. 1,784,525 above mentioned, to dewax it before purifying it to desired color but after removing from it, if necessary, impurities that interfere with the precipitation and centrifugal removal of the wax.

Further discussing the general characteristics of oil, oils identified in my patent and applications above mentioned and herein as oils that may be dewaxed by continuous centrifuging although they contain wax which when precipitated by chilling to —15° F. is in a form that impairs the effectiveness of or prevents such separation, are readily recognizable by refiners but for completeness it is noted here that such oils include the following fractions produced without substantial cracking:

I.—Residues of petroleum respectively having flash ponts below 450° F. (e. g. a flash point of 350° F.) and Saybolt universal viscosities at 210° F. from 60 seconds to 90 seconds (1000 seconds at 100° F.) depending upon the flash point and upon the source of the crude petroleum, said viscosities being measured when the oil is substantially free of impurities commonly removed by acid treatment. From such residues there can be recovered by distillation individual oils varying, in viscosity, from low viscosity neutral distillates (e. g. 45 seconds to 50 seconds Saybolt universal viscosity at 210° F.) to high viscosity cylinder stocks (e. g. 200 seconds Saybolt universal viscosity at 210° F.), such residues being commonly called long residues or long residua.

II.—Distillates of petroleum respectively having flash points below 470° F. (e. g. a flash point of 400° F.) and Saybolt universal viscosities at 210° F. from 55 seconds (250 seconds at 100° F.) to 90 seconds, depending upon the flash point and upon the source of the crude petroleum and upon the extent to which the higher boiling constituents of the petroleum are carried into the distillate. Such distillates may be of such broad boiling range that there may be recovered from them by distillation individual oils varying, in viscosity, from low viscosity neutral distillates (e. g. 45 seconds to 50 seconds Saybolt universal viscosity at 210° F.) to cylinder stocks, or may be of such narrow boiling range that there may be recovered from them by distillation only individual oils of very limited viscosity range.

If the viscosity of the distillate is below 55 seconds Saybolt universal viscosity at 210° F. it probably contains so much crystalline wax that it is preferable to dewax the whole distillate by filter-pressing or to remove from the distillate by distillation some of the crystalline wax together with lower boiling oils and to separate the wax by filter-pressing from the oils so removed. An examination of the above definition of distillates shows that the Examples A and B above referred to constitute oils in which the precipitated wax is about as extensively influenced by the presence of crystalline wax as it may be while still being removable by continuous centrifugal separation in the practice of this invention. Such distillates being dewaxable in the practice of this invention, naturally all oils in which the precipitated wax is less influenced by crystalline wax will be dewaxable by continuous centrifugal separation in the practice of this invention.

Continuing the discussion of oils, as the flash point of the oil increases, as by distilling off more and more of the crude petroleum, the smaller will be the proportion of crystalline wax remaining in the oil and the larger will be the proportion of amorphous wax remaining in the oil, and the difficulties involved in continuous centrifugal separation of precipitated wax accordingly decrease. As the flash point increases and rises to 450° F. and exceeds that point the oil then falls within that class of oils above mentioned from which such lower cold test oils can also be produced in accordance with this invention and in which the wax is sufficiently amorphous, even when precipitated by chilling only to −15° F., to be removed by cold settling or by more simple centrifugal dewaxing operations. Such oils are readily recognizable by refiners but for completeness it is noted here that they include the following fractions produced without substantial cracking:

III.—Residues of petroleum respectively having flash points above 450° F. and Saybolt universal viscosities at 210° F. from 75 seconds to 200 seconds depending upon the flash point and upon the source of the crude petroleum, said viscosities being measured when the oil is substantially free of impurities commonly removed by acid treatment. From such residues there can be recovered by distillation individual oils varying, in viscosity, from medium viscosity neutral distillates (e. g. 55 seconds at 210° F. or 300 seconds at 100° F.) to high viscosity cylinder stocks (e. g. 200 seconds Saybolt universal viscosity at 210° F.).

IV.—Distillates of petroleum having flash points above 470° F. and Saybolt universal viscosities at 210° F. from 60 seconds to 150 seconds, depending upon the flash point and upon the source of the crude petroleum and upon the extent to which the higher boiling constituents of the petroleum are carried into the distillate. Such distillates may be of such broad boiling range that there may be recovered from them by distillation individual oils varying, in viscosity, from medium neutral distillates to cylinder stock, or which may be of such narrow boiling range that there may be recovered from them by distillation only separate oils of very limited viscosity range. Thus in the practice of this invention wax may be removed for the purpose of producing such lower cold test oils, from oils having flash points varying from below 350° F. up to the highest flash point obtainable without substantial cracking. Inasmuch as such wax-containing oils may be residues of wax-containing petroleum, or distillates, or residues of distillates formed by distilling such petroleum with steam to asphalt or to flux or to any desired bottoms, or wax containing fractions obtained by continuous pipe-still and fractionating-tower distillation, oils having such lower cold test and having substantially any possible viscosity can be obtained from the dewaxed oil by the application of common refinery steps. On this discussion of oils it is clear that, as stated above, oils having a Saybolt universal viscosity of 300 seconds at 100° F. will contain crystalline wax that may impose difficulties upon continuous centrifugal dewaxing and that the possibility of such difficulties exists as more and more of the lighter constituents and the crystalline wax are distilled off, up to a point at which the viscosity of the remaining oil is as high as 800 seconds Saybolt universal viscosity at 100° F. (80 seconds at 210° F.).

The viscosity and flash point of an oil desired for commercial purposes being known, the operator need only select a distillate or residue which contains oil that possesses such viscosity and flash point and dewax the selected body of oil in accordance with this invention, and then separate from the dewaxed oil by distillation a body of oil having the desired viscosity and flash point. The final product can be obtained either from a distillate or from a residue with a cold test of approximately 0° F. A typical example of oils obtained by the practice of this invention from mid-continent crude petroleum is as follows:

|  | Long residuum | Neutral | Bright stock |
| --- | --- | --- | --- |
| Cold test | 0° F. | 0° F. | 5° F. |
| Cloud | None at −30° F. | 2° F. | None at −30° F. |
| Flash | 445° F. | 385° F. | 540° F. |
| Fire | 510° F. | 460° F. | 620° F. |
| Viscosity | 86 at 210° F. | 224 at 100° F. | 156 at 210° F. |

Herein the expression "cold test" refers to the

A. S. T. M. pour test, and the expression "cloud test" refers to the A. S. T. M. cloud test.

If a long residuum of a wax-containing crude petroleum is dewaxed by chilling only to $-15°$ F. and the resulting dewaxed oil is divided by distillation into neutral oil and bright stock the neutral oil will have a cold test ($25°$ F. to $30°$ F.) that is higher than the cold test ($15°$ F. to $20°$ F.) of the whole body of dewaxed oil before being so divided and the bright stock will have a slightly lower cold test ($10°$ F. to $15°$ F.) than the cold test of that whole body; and the cloud test of the whole dewaxed residue and of the neutrals and bright stock will be about the same as the cold tests thereof. But, if the same residuum is completely dewaxed in accordance with this invention, the cold test of the whole dewaxed residuum will be approximately $0°$ F. and the cloud test lower; and if the neutrals are separated from the dewaxed residuum any such excess of the cold test of the neutrals over that of the whole residuum will be minimized or will not occur; and while the cold test of the bright stock may be higher than that of the dewaxed residuum that is due to the viscosity of the oil and not to the presence of wax as no cloud will appear even upon chilling to $-30°$ F., showing that by this invention removal of wax is substantially complete.

For clearness it is pointed out that a statement herein that the viscosity of an oil lies within stated limits (e. g., from 60 seconds to 90 seconds at $210°$ F.) does not mean that the least viscous constituent of the oil has the viscosity indicated by the lower viscosity of the stated limits and that the most viscous constituent present has the viscosity indicated by the higher viscosity of the stated limits (in the manner in which a stated boiling range indicates the boiling points of all of the constituents present) but it means that the viscosity, which is determined by measuring the viscosity of the whole body of oil and which is due to the cumulative and simultaneous effect of the viscosities of all of the individual constituents of the oil, may lie anywhere between the stated limits depending upon the proportions in which high and low viscosity constituents are present. For example, a body of oil may have a viscosity of 70 seconds Saybolt universal at $210°$ F. and it therefore lies within the stated limits (60–90 seconds), but, as in the case of a residue of petroleum, it will contain constituent oils having both lower and higher viscosities, e. g., down to 45 seconds and up to 200 seconds at $210°$ F., and as more and more lighter constituents are eliminated by distillation the viscosity of the remaining residue will increase gradually through a range from 70 seconds up to the viscosity of such most viscous constituents. Thus a reference herein to bodies of oil having Saybolt universal viscosities from 60 seconds to 90 seconds at $210°$ F. is intended to mean bodies of oil, the Saybolt universal viscosity of each of which, when determined by measuring the viscosity of the whole body of oil, falls between 60 and 90 seconds at $210°$ F., although each of such bodies contains constituents, which, if isolated by distillation, respectively have viscosities which are lower and higher than the viscosity of the whole body of oil and may be beyond the stated limits.

Inasmuch as the wax in undewaxed fractions of wax-containing oils renders inaccurate viscosity determination made at $100°$ F. the measurement of viscosities at $210°$ F. is preferable for such oils, and conversion of such values to viscosities at $100°$ F. can be effected by the Winslow H. Herschel viscosity chart fully described in "The Oil and Gas Journal" for December 2, 1926. When Saybolt universal viscosity is below 50 seconds at $210°$ F. the viscosity determinations are not distinctive at that temperature and determinations at $100°$ F. are preferable. In accordance with said chart viscosities of wax-containing petroleum oils which are 300 seconds and 800 seconds at $100°$ F. correspond respectively to viscosities of substantially 52 seconds and 85 seconds at $210°$ F.

The A. S. T. M. pour test is an arbitrary test developed to indicate the temperature at which an oil containing wax passes from a liquid state to a plastic or solid state because of the congealing of wax therein. Oils which do not contain wax do not pass from this liquid state to a plastic or solid state but remain liquid at increasingly lower temperature even though their viscosity increases. When the A. S. T. M. pour test is applied to oils dewaxed in accordance with this invention and which do not contain wax that cold test indicates only the temperature at which the viscosity of the unsolidified and still liquid oil becomes so great that the oil will not flow under the particular conditions specified for this test.

Even though oil dewaxed according to this invention and which contains substantially no wax, as indicated by the fact that the cloud test is extremely low, has such a "cold test" of approximately $0°$ F., the oil is nevertheless liquid although cooled to a temperature much below such "cold test"; and the viscosity of such dewaxed oil changes with temperature, within a range of temperature below its so-called "cold test", at a rate which is comparable with the rate at which the viscosity of oil which does contain wax changes with temperature within a range of temperatures that are above the cold test of those wax-containing oils.

There is therefore no sharp change in the fluidity of oils dewaxed in accordance with this invention and no sharp change in the rate of change of viscosity with temperature as the temperature passes downwardly through the so-called "cold test" value.

Naphthene base oils which naturally contain no wax possess the same characteristics of increasing viscosity with decrease in temperature without abrupt change from a liquid to a solid or plastic state.

In contrast however to the wax free oil prepared in accordance with this invention, the change in viscosity of naphthene base oils with change in temperature is very much more rapid than in the case of oils prepared by completely dewaxing a paraffin base oil and at very low temperatures such as $-30°$ F. the viscosity of the naphthene base oil will be many times that of the fully dewaxed paraffin base oil, even though their viscosities may be approximately the same at $100°$ F. or $210°$ F.

Also it is known that oils prepared from wax bearing petroleum have a less rapid change of viscosity with increasing temperatures than oils prepared from a naphthene base petroleum and therefore at very elevated temperatures such as $600°$ F., the oils prepared from wax-containing petroleum retain an appreciable viscosity and possess lubricating values, while the viscosity of oils prepared from naphthene base petroleum is reduced to such a low value at 600° F. that their value as a lubricant is negligible.

In other words, oils prepared in accordance with this invention possess, over a range from —40° F. or —30° F. to 600° F., temperature-viscosity characteristics of oils prepared from wax-containing petroleum, which characteristics make them superior at elevated temperatures to oils prepared from naphthene base petroleum and make them superior at low temperatures to both oils prepared from naphthene base petroleum and oil heretofore prepared from wax-containing petroleum, in that, at very low temperatures such as —40° F., they retain their fluidity while oils previously prepared from wax-containing petroleum become solid or plastic at 20° F., and at such low temperatures (—40° F.) they are more fluid, because of their temperature-viscosity characteristics, than corresponding oils prepared from naphthene base petroleum.

By this invention it is possible to produce oils of low cold test which may be used under very low temperature conditions in circulating and lubricating systems where formerly only lubricants prepared from naphthene base petroleum could be used. The oils prepared according to this invention have a greater fluidity at these low temperatures than the oils prepared from naphthene base petroleum and in addition make available for these special applications lubricants possessing the superior quality at high temperatures that is possessed by oils produced from wax-bearing petroleum.

In circulating and lubricating systems including a pump only the pressure of the atmosphere is available for forcing the lubricant into the suction of the pump and when these systems are used on internal combustion engines, such as aeroplane engines, operated at high altitudes and therefore under low atmospheric pressure, the available pressure for forcing the oil into the suction of the pump is sufficient to force these lower cold test oils into the suction of the pump although it may be substantially less than the normal atmospheric pressure of 15 pounds per square inch.

While 450° F. has been referred to in the case of residues and 470° F. has been referred to in the case of distillates, as the flash point below which the presence of crystalline wax makes dewaxing by continuous centrifugal separation troublesome, and above which the crystalline wax does not interfere with such continuous centrifugal separation of wax, the temperature at which such change occurs may vary in either direction, depending upon the source of the crude petroleum from which the residue or the distillate is prepared, through a range of five or ten degrees on either side of the specified values.

Residues prepared from various crude petroleums and having a flash test of 450° F. will vary somewhat in viscosity depending upon the characteristics of the petroleum from which the residues are prepared. The lowest usual value of the Saybolt universal viscosity for a flash test of 450° F. is 75 seconds at 210° F. and the highest usual value for such viscosity at this flash test is 90 seconds at 210° F. Correspondingly the viscosities for distillates having a flash test of 470° F. are dependent upon the characteristics of the crude petroleum from which the distillates are prepared and also upon the extent to which the heavier constituents of petroleum are brought into the distillate. The minimum Saybolt universal viscosity for that flash test is 60 seconds at 210° F. and the maximum viscosity of a distillate of that flash test is 90 seconds at 210° F.

Whether the crystalline wax present in the residue or distillate is troublesome in continuous centrifugal separation is closely related to the flash test of the residue or the distillate and is not related to the viscosity of the residues or distillates. In any event I have described herein and in my patent and applications above mentioned, special features which make it possible to employ centrifugal separation in spite of the presence of crystalline wax and if the precipitated wax is substantially all amorphous no difficulty exists; and I describe herein a method, and the products, produced thereby, for producing oils having substantially 0° F. cold test from substantially any body of wax-containing oil, including bodies of oil containing substantially all of the lubricating constituents of crude oil, and when such bodies of lower cold test oil have been produced there can be recovered from them lubricating oils having such low cold test and having any desired viscosity between 45 seconds and 200 seconds Saybolt universal viscosity at 210° F., e. g. 50, 55, 60, 70, 80, 88, 100, 125, 155, 175, 200 seconds.

This application is a continuation in part of my copending application Serial No. 285,840, filed June 16, 1928 and contains additional matter explanatory of what is disclosed in said application.

I claim:

1. In the dewaxing of oil that contains wax which when precipitated by reduction of temperature to —15° F. is too amorphous to be removed by ordinary filter-pressing and too crystalline to be removed by cold-settling, the step comprising reducing the temperature of the oil in a diluted state to a temperature between —20° F. and —40° F., and separating the precipitated wax from the chilled oil by centrifugal dewaxing.

2. In the dewaxing of oil that contains wax which when precipitated by reduction of temperature to —15° F. is too amorphous to be removed by ordinary filter-pressing and too crystalline to be removed by cold-settling, the step comprising reducing the temperature of the oil in a diluted state to a temperature of about —30° F., and centrifugally separating the precipitated wax from the chilled oil.

3. In the dewaxing of oil that contains wax which when precipitated by chilling to —15° F. is too amorphous to be removed by ordinary filter-pressing and too crystalline to be removed by continuous centrifugal separation, the steps comprising reducing the temperature of the oil in a diluted state to a sufficiently lower temperature than —15° F. to precipitate enough soft and more soluble wax in addition to the wax precipitated by chilling to —15° F. to render the precipitated wax sufficiently soft and leave the diluted oil sufficiently fluid to facilitate removal of the precipitated wax from the oil by continuous centrifugal separation, and removing the precipitated wax from the oil at such reduced temperature by methods suitable to the removal of wax precipitated in such form.

4. In the production of dewaxed lubricating oil from wax-containing crude petroleum, the steps comprising producing from wax-containing crude petroleum by distillation lubricating oil containing wax which is too amorphous for removal by ordinary filter-pressing and sufficiently crystalline to impair or prevent continuous centrifugal removal thereof when precipitated by chilling to temperatures between −10° F. and −15° F., subjecting the oil to treatment for the removal of asphalt and for the removal of color-forming impurities, diluting the purified oil with a solvent, chilling the mixture to a temperature between −20° F. and −40° F. to precipitate the wax therein, removing the precipitated wax from the chilled oil solution by continuous centrifugal separation, and removing the solvent from the oil.

5. In a method of producing a dewaxed lubricating oil of low cold test from wax-containing crude petroleum, the steps comprising producing from wax-containing crude petroleum by distillation a lubricating oil containing amorphous wax and containing such proportion of crystalline wax as to impair or prevent continuous centrifugal removal of wax precipitated by chilling to −10° F. of a naphtha solution of the oil in purified state, treating the oil for the removal of asphalt and color-forming impurities, diluting the oil with a solvent, chilling the solution to a temperature below −20° F. and thereby precipitating wax therein, separating the precipitated wax from the chilled solution, and separating the solvent from the dewaxed oil.

6. In a method for producing low cold test, dewaxed lubricating oil, the steps comprising diluting with a solvent that portion of wax-containing petroleum which comprises lubricating oil containing wax that precipitates from a naphtha solution of the oil in purified state by chilling such solution to −10° F. in a form that is too amorphous for removal by ordinary filter pressing and is sufficiently crystalline to impair or prevent removal by continuous centrifugal separation, chilling the solution of the oil to a temperature below −20° F. and thereby precipitating wax therein, and then separating precipitated wax from the chilled solution by continuous centrifugal separation.

7. In a method of producing a dewaxed lubricating oil of low cold test from wax-containing crude petroleum, the steps comprising producing from wax-containing crude petroleum by distillation a lubricating oil containing amorphous wax and containing such proportion of crystalline wax as to impair or prevent continuous centrifugal removal of wax precipitated by chilling a naphtha solution of the oil in purified state to −10° F., diluting the oil with a solvent, chilling the solution to a temperature below −20° F. and thereby precipitating wax therein, separating the precipitated wax from the chilled solution, and separating the solvent from the dewaxed oil.

8. In a method of producing a dewaxed lubricating oil of low cold test from wax-containing crude petroleum, the steps comprising producing from wax-containing crude petroleum by distillation a lubricating oil distillate containing amorphous wax and containing such proportion of crystalline wax as to impair or prevent continuous centrifugal removal of wax precipitated by chilling a naphtha solution of the distillate in purified state to −10° F., diluting the distillate with a solvent, chilling the solution to a temperature below −20° F. and thereby precipitating wax therein, and separating precipitated wax from the chilled solution.

9. In a method of producing a dewaxed lubricating oil of low cold test from wax-containing crude petroleum, the steps comprising producing from wax-containing crude petroleum by distillation a residue containing amorphous wax and containing such proportion of crystalline wax as to impair or prevent continuous centrifugal removal of wax precipitated by chilling to −10° F. of a naphtha solution of the residue in purified state, diluting the residue with a solvent, chilling the solution to a temperature below −20° F. and thereby precipitating wax therein, separating the precipitated wax from the chilled solution, and separating the solvent from the dewaxed oil.

10. In a method of producing a dewaxed lubricating oil of low cold test from wax-containing crude petroleum, the steps comprising producing from wax-containing crude petroleum by distillation a residue containing amorphous wax and containing such proportion of crystalline wax as to impair or prevent continuous centrifugal removal of wax precipitated by chilling to −10° F. of a naphtha solution of the residue in purified state, treating the oil for the removal of asphalt and color-forming impurities, diluting the oil with a solvent, chilling the solution to a temperature below −20° F. and thereby precipitating wax therein, separating the precipitated wax from the chilled solution, and separating the solvent from the dewaxed oil.

11. The method of producing a dewaxed paraffin base residual oil having a low cold test from an originally residual undewaxed base containing amorphous wax and crystalline wax which comprises providing a residual oil from which the lighter fractions have been distilled to produce a residue containing amorphous wax and such proportion of crystalline wax as to impair or prevent continuous centrifugal removal of wax precipitated by chilling to −10° F. of a naphtha solution of the residual oil in purified state, thinning the residue with a solvent, chilling the solution to a temperature below −20° F. to congeal the wax, separating the congealed wax from the chilled oil, and separating the solvent from the dewaxed oil.

12. In the production of dewaxed lubricating oil from wax-containing crude petroleum, the steps comprising producing from crude petroleum by distillation a lubricating oil having a Saybolt universal viscosity in the neighborhood of 800 seconds at 100° F., and containing sufficient crystalline wax to impair or prevent continuous centrifugal removal of wax precipitated by chilling a naphtha solution of the oil in purified state to −10° F., diluting the oil with a solvent, chilling the mixture to a temperature below −20° F. and thereby precipitating wax therein, removing the precipitated wax from the chilled oil solution by continuous centrifugal separation, and removing the solvent from the oil.

13. In the production of dewaxed lubricating oil from wax-containing crude petroleum, the steps comprising producing from crude petroleum by distillation a lubricating oil having a Saybolt universal viscosity between approximately 300 seconds and 800 seconds at 100° F., and containing sufficient crystalline wax to impair or prevent continuous centrifugal removal of wax precipitated by chilling a naphtha solution of the oil in purified state to −10° F., diluting the oil with a solvent, chilling the mixture to a temperature below −20° F. and thereby precipitating wax therein, removing the precipitated wax from the chilled oil solution by continuous centrifugal separation, and removing the solvent from the oil.

14. In the production of dewaxed lubricating oil from wax-containing crude petroleum, the steps comprising producing from crude petroleum by distillation a lubricating oil distillate having a Saybolt universal viscosity between approximately 300 seconds and 800 seconds at 100° F., and containing sufficient crystalline wax to impair or prevent continuous centrifugal removal of wax precipitated by chilling a naphtha solution of the oil in purified state to −10° F., diluting the oil with a solvent, chilling the mixture to a temperature below −20° F. and thereby precipitating the wax therein, removing the precipitated wax from the chilled oil solution by continuous centrifugal separation, and removing the solvent from the oil.

15. A low pour test, dewaxed, natural lubricating oil obtained from wax-containing crude petroleum and having a pour test in the neighborhood of 0° F. and a Saybolt universal viscosity of approximately 300 to 800 seconds at 100° F.; and produced from an undewaxed lubricating oil stock obtained from wax-containing petroleum, and containing sufficient crystalline wax to impair or prevent continuous centrifugal removal of wax precipitated by chilling a naphtha solution of the oil in purified state to −10° F., by diluting the stock with a solvent, chilling the solution to a temperature below −20° F. and thereby precipitating wax therein, and separating, by difference in specific gravity, the precipitated wax from the chilled oil solution.

16. A low pour test, dewaxed, natural, lubricating oil obtained from wax-containing crude petroleum having a pour test in the neighborhood of 0° F., and produced from an undewaxed lubricating oil stock containing amorphous wax and containing sufficient crystalline wax to impair or prevent continuous centrifugal removal of wax precipitated by chilling a naphtha solution of the oil in purified state to −10° F., by diluting the stock with a solvent, chilling the solution to a temperature below −20° F. and thereby precipitating wax therein, and separating the precipitated wax from the chilled oil solution.

17. A low pour-test, dewaxed lubricating oil obtained from wax-containing petroleum oil and having a pour-test in the neighborhood of 0° F., and produced from an undewaxed petroleum distillate, by diluting with a solvent a distillate having a flash-point below approximately 470° F. and obtained from wax-containing crude petroleum and containing amorphous wax and sufficient crystalline wax to impair or prevent continuous centrifugal removal of wax precipitated by chilling a naphtha solution of the oil in purified state to −10° F., chilling the solution to a temperature below −20° F. to precipitate wax, separating wax from the chilled solution, and removing solvent from the dewaxed oil.

18. A low pour-test, natural, dewaxed, lubricating oil prepared from a wax-containing petroleum by diluting with a solvent a residue thereof having a flash-point below approximately 450° F. and containing amorphous wax and sufficient crystalline wax to impair or prevent continuous centrifugal removal of wax precipitated by chilling a naphtha solution of the oil in purified state to −10° F., chilling the solution to a temperature below −20° F. to precipitate wax therein, separating precipitated wax from the chilled solution, and removing solvent from the dewaxed oil.

19. A low pour-test, natural, dewaxed, lubricating oil prepared from a wax-containing petroleum by diluting with a solvent a residue thereof containing amorphous wax and containing crystalline wax in such proportion as to impair or prevent continuous centrifugal dewaxing of a naphtha solution of the residue in purified state chilled to −10° F., chilling the solution to a temperature below −20° F. to precipitate wax therein, separating precipitated wax from the chilled solution, and removing solvent from the dewaxed oil.

20. In a method of producing a dewaxed lubricating oil of low cold test from wax-containing crude petroleum, the steps comprising producing from wax-containing crude petroleum by distillation a lubricating oil distillate thereof having a flash-point below approximately 470° F. and containing amorphous wax and containing such proportion of crystalline wax as to impair or prevent continuous centrifugal removal of wax precipitated by chilling a naphtha solution of the oil in purified state to −10° F., diluting the oil with a solvent, chilling the solution to a temperature below −20° F. and thereby precipitating wax therein, separating the precipitated wax from the chilled solution, and separating the solvent from the dewaxed oil.

21. In a method of producing a dewaxed lubricating oil of low cold test from wax-containing crude petroleum, the steps comprising producing from wax-containing crude petroleum by distillation a lubricating oil distillate thereof having a flash-point below approximately 470° F. and a Saybolt universal viscosity at 210° F. between approximately 55 and 90 seconds and containing amorphous wax and containing such proportion of crystalline wax as to impair or prevent continuous centrifugal removal of wax precipitated by chilling a naphtha solution of the oil in purified state to −10° F., diluting the oil with a solvent, chilling the solution to a temperature below −20° F. and thereby precipitating wax therein, separating the precipitated wax from the chilled solution, and separating the solvent from the dewaxed oil.

22. In a method of producing a dewaxed lubricating oil of low cold test from wax-containing crude petroleum, the steps comprising producing from wax-containing crude petroleum by distillation a residue having a flash-point below approximately 450° F. and containing amorphous wax and containing such proportion of crystalline wax as to impair or prevent continuous centrifugal removal of wax precipitated by chilling to −10° F. of a naphtha solution of the residue in purified state, diluting the residue with a solvent, chilling the solution to a temperature below −20° F. and thereby precipitating wax therein, separating the precipitated wax from the chilled solution, and separating the solvent from the dewaxed oil.

23. In a method of producing a dewaxed lubricating oil of low cold test from wax-containing crude petroleum, the steps comprising producing from wax-containing crude petroleum by distillation a residue having a flash-point below approximately 450° F. and a Saybolt universal viscosity between approximately 60 and 90 seconds at 210° F. and containing amorphous wax and containing such proportion of crystalline wax as to impair or prevent continuous centrifugal removal of wax precipitated by chilling to −10° F. of a naphtha solution of the residue in purified state, diluting the residue with a solvent, chilling the solution to a temperature below −20° F. and thereby precipitating wax therein, separating the precipitated wax from the chilled solution, and separating the solvent from the dewaxed oil.

24. In a method for producing low pour-test, dewaxed lubricating oil, the steps comprising producing by steam distillation of wax-containing petroleum oil a distillate fraction containing wax of such character and present in such amount that the wax precipitated from a naphtha solution of the oil in a purified state by chilling such solution to −10° F. is too amorphous for removal by ordinary filter-pressing and is sufficiently crystalline to impair or prevent removal by difference of specific gravity and said fraction beginning when the stream viscosity is in the neighborhood of 80 seconds Saybolt universal viscosity at 100° F. and ending when the fire-test of the residue is in the neighborhood of 600° F., diluting the distillate with a solvent, chilling the solution to a temperature below −20° F., and separating the precipitated wax from the chilled solution.

25. In a method for producing low pour-test, dewaxed lubricating oil, the steps comprising producing by steam distillation of wax-containing petroleum oil a distillate fraction containing wax of such character and present in such amount that the wax precipitated from a naphtha solution of the oil in a purified state by chilling such solution to −10° F. is too amorphous for removal by ordinary filter-pressing and is sufficiently crystalline to impair or prevent removal by difference of specific gravity and said fraction beginning when the stream viscosity is in the neighborhood of 80 seconds Saybolt universal viscosity at 100° F. and ending when the fire-test of the residue is in the neighborhood of 600° F., subjecting the distillate to treatment for the removal of color forming impurities, diluting the purified distillate with a solvent, chilling the solution to a temperature below −20° F., and separating the precipitated wax from the chilled solution.

26. In a method for producing low pour-test, dewaxed lubricating oil, the steps comprising producing by steam distillation of wax-containing petroleum oil a distillate fraction containing wax of such character and present in such amount that the wax precipitated from a naphtha solution of the oil in a purified state by chilling such solution to −10° F. is too amorphous for removal by ordinary filter-pressing and is sufficiently crystalline to impair or prevent removal by difference of specific gravity and said fraction beginning when the stream viscosity is in the neighborhood of 80 seconds Saybolt universal viscosity at 100° F. and ending when the fire-test of the residue is in the neighborhood of 600° F., diluting the distillate with a solvent, chilling the solution to a temperature below −20° F. at which the precipitated wax is sufficiently amorphous for continuous centrifugal removal, separating the precipitated wax from the chilled solution by continuous centrifugal removal, and removing solvent from the dewaxed oil.

27. In a method for producing low pour-test, dewaxed lubricating oil, the steps comprising producing by steam distillation of Pennsylvania petroleum oil a distillate fraction containing wax of such character and present in such amount that the wax precipitated from a naphtha solution of the oil in a purified state by chilling such solution to −10° F. is too amorphous for removal by ordinary filter-pressing and is sufficiently crystalline to impair or prevent removal by difference of specific gravity and said fraction beginning when the stream viscosity is in the neighborhood of 80 seconds Saybolt universal viscosity at 100° F. and ending when the Bé. gravity of the residue is in the neighborhood of 27°, diluting the distillate with a solvent, chilling the solution to a temperature below −20° F., and separating the precipitated wax from the chilled solution.

28. A low pour-test, dewaxed, natural, unblended lubricating oil obtained from wax-containing crude petroleum and having a pour-test in the neighborhood of 0° F. and a Saybolt universal viscosity of approximately 300 to 800 seconds at 100° F., and produced from an undewaxed lubricating oil fraction containing wax of such character and present in such amount that the wax precipitated from a naphtha solution of the oil in a purified state by chilling such solution to −10° F. is too amorphous for removal by ordinary filter-pressing and is sufficiently crystalline to impair or prevent removal by difference of specific gravity and said fraction being obtained from wax-containing petroleum after the stream viscosity is in the neighborhood of 80 seconds and before the fire-test of the residue exceeds substantially 600° F., by diluting the oil with a solvent, chilling the solution to a temperature below −20° F. at which the precipitated wax is sufficiently amorphous for centrifugal removal, separating the precipitated wax from the chilled solution, and removing the solvent from the resulting solution of oil.

29. In a method for producing low pour-test, dewaxed lubricating oil, the steps comprising producing by steam distillation of wax-containing petroleum oil a distillate fraction containing wax of such character and present in such amount that the wax precipitated from a naphtha solution of the oil in a purified state by chilling such solution to −10° F. is too amorphous for removal by ordinary filter-pressing and is sufficiently crystalline to impair or prevent removal by difference of specific gravity and said fraction beginning when the stream viscosity is not less than 80 seconds universal Saybolt viscosity at 100° F. and ending when the fire-test of the residue is not above 600° F., chilling a solution of the distillate in a solvent to a temperature below −20° F., and separating the precipitated wax from the chilled solution.

30. In a method for producing low pour-test, dewaxed lubricating oil, the steps comprising producing by steam distillation of wax-containing petroleum oil a distillate fraction containing wax of such character and present in such amount that the wax precipitated from a naphtha solution of the oil in a purified state by chilling such solution to −10° F. is too amorphous for removal by ordinary filter-pressing and is sufficiently crystalline to impair or prevent removal by difference of specific gravity and said fraction beginning when the stream viscosity is not less than 80 seconds universal Saybolt viscosity at 100° F. and ending when the fire-test of the residue is not above 600° F., subjecting the distillate to treatment for the removal of color-forming impurities, chilling a solution of the distillate in a solvent to a temperature below −20° F., and separating the precipitated wax from the chilled solution.

31. A low pour-test, dewaxed, natural, unblended lubricating oil obtained from wax-containing crude petroleum and having a pour-test in the neighborhood of 0° F. and a Saybolt universal viscosity of approximately 300 to 800 seconds at 100° F., and produced from an undewaxed lubricating oil fraction containing wax of such character and present in such amount that the wax precipitated from a naphtha solution of the oil in a purified state by chilling such solution to $-10°$ F. is too amorphous for removal by ordinary filter-pressing and is sufficiently crystalline to impair or prevent removal by difference of specific gravity and said fraction being obtained from wax-containing petroleum after the stream viscosity is not less than 80 seconds universal Saybolt viscosity at 100° F. and before the fire-test of the residue exceeds substantially 600° F., by chilling a solution of the distillate in a solvent to a temperature below $-20°$ F. and thereby precipitating wax therein, separating, by difference in specific gravity, the precipitated wax from the chilled solution, and removing the solvent from the resulting solution of oil.

LEO D. JONES.

Certificate of Correction

Patent No. 2,036,966.　　　　　　　　　　　　　　　　　　　　　　April 7, 1936.

LEO D. JONES

It is hereby certified that error appears in the printed specification of the above numbered patent requiring correction as follows: Page 4, second column, line 43, for "15°" read $-15°$; and that the said Letters Patent should be read with this correction therein that the same may conform to the record of the case in the Patent Office.

Signed and sealed this 12th day of May, A. D. 1936.

[SEAL]　　　　　　　　　　　　　　　　　　　　　　　　　　LESLIE FRAZER,
*Acting Commissioner of Patents.*